US008543692B2

(12) United States Patent
Takeshima et al.

(10) Patent No.: US 8,543,692 B2
(45) Date of Patent: Sep. 24, 2013

(54) NETWORK SYSTEM

(75) Inventors: Yoshiteru Takeshima, Tokyo (JP);
Masahiko Nakahara, Machida (JP)

(73) Assignee: Hitachi, Ltd., Tokyo (JP)

( * ) Notice: Subject to any disclaimer, the term of this patent is extended or adjusted under 35 U.S.C. 154(b) by 100 days.

(21) Appl. No.: 13/216,112

(22) Filed: Aug. 23, 2011

(65) Prior Publication Data

US 2012/0102192 A1 Apr. 26, 2012

(30) Foreign Application Priority Data

Oct. 22, 2010 (JP) ................................. 2010-236982

(51) Int. Cl.
*G06F 15/16* (2006.01)
*G06F 15/173* (2006.01)

(52) U.S. Cl.
USPC ............ 709/224; 709/223; 709/226; 709/219

(58) Field of Classification Search
USPC .......................... 709/223, 224, 203, 239, 242
See application file for complete search history.

(56) References Cited

U.S. PATENT DOCUMENTS

| 7,284,051 | B1* | 10/2007 | Okano et al. | 709/226 |
| 2004/0250059 | A1* | 12/2004 | Ramelson et al. | 713/150 |
| 2008/0095153 | A1* | 4/2008 | Fukunaga et al. | 370/389 |
| 2008/0291916 | A1* | 11/2008 | Xiong et al. | 370/392 |
| 2009/0287955 | A1* | 11/2009 | Matsumoto et al. | 714/4 |
| 2012/0254357 | A1* | 10/2012 | Kawakami et al. | 709/217 |

* cited by examiner

*Primary Examiner* — Joseph Avellino
*Assistant Examiner* — Aftab Nasir Khan
(74) *Attorney, Agent, or Firm* — Foley & Lardner LLP

(57) ABSTRACT

The disclosed DNS server apparatus monitors whether each service providing server apparatus is active or inactive and collects load information. When the monitored apparatus is active but congested or is unable to offer services, a virtual IP address assigned to a Sorry server apparatus is sent back as a response. When service providing server apparatuses in active state are congested or unable to provide services, the DNS server apparatus sends a server activation instruction and an IP addresses for services to the service providing server apparatuses on standby to activate them. Each service providing server apparatus on standby activates server software in response to the server activation instruction and assigns the received IP address to a network interface as a virtual IP address, thus activating the interface.

7 Claims, 10 Drawing Sheets

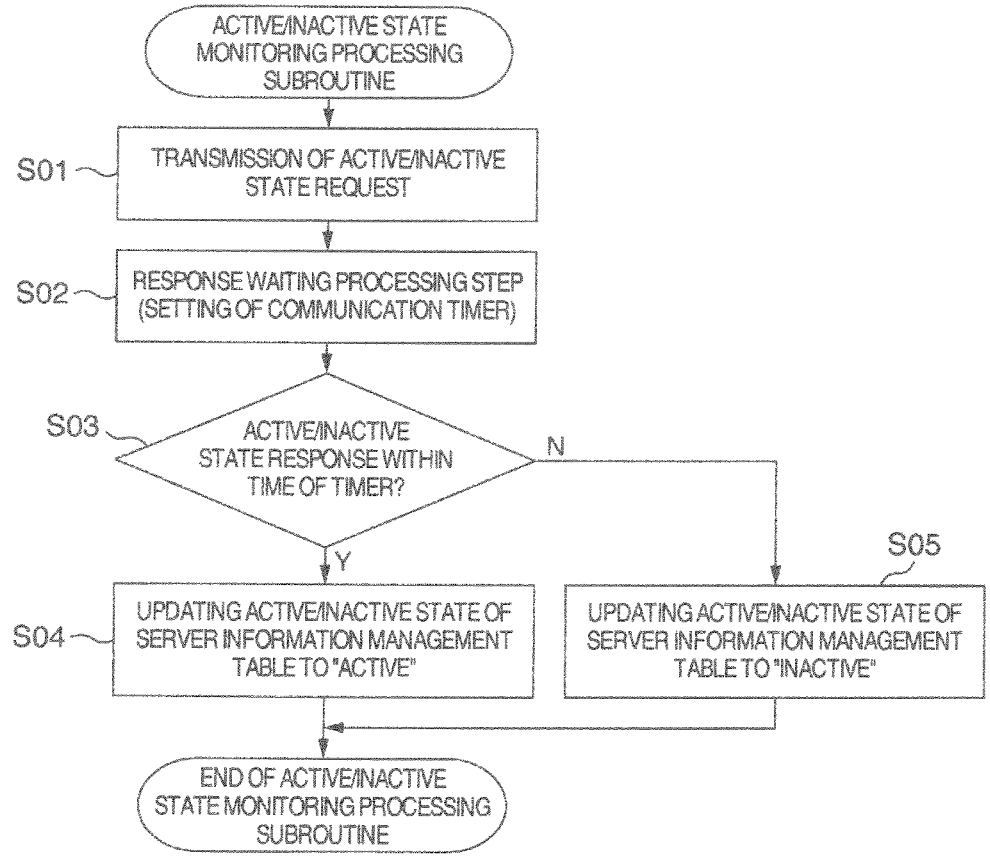

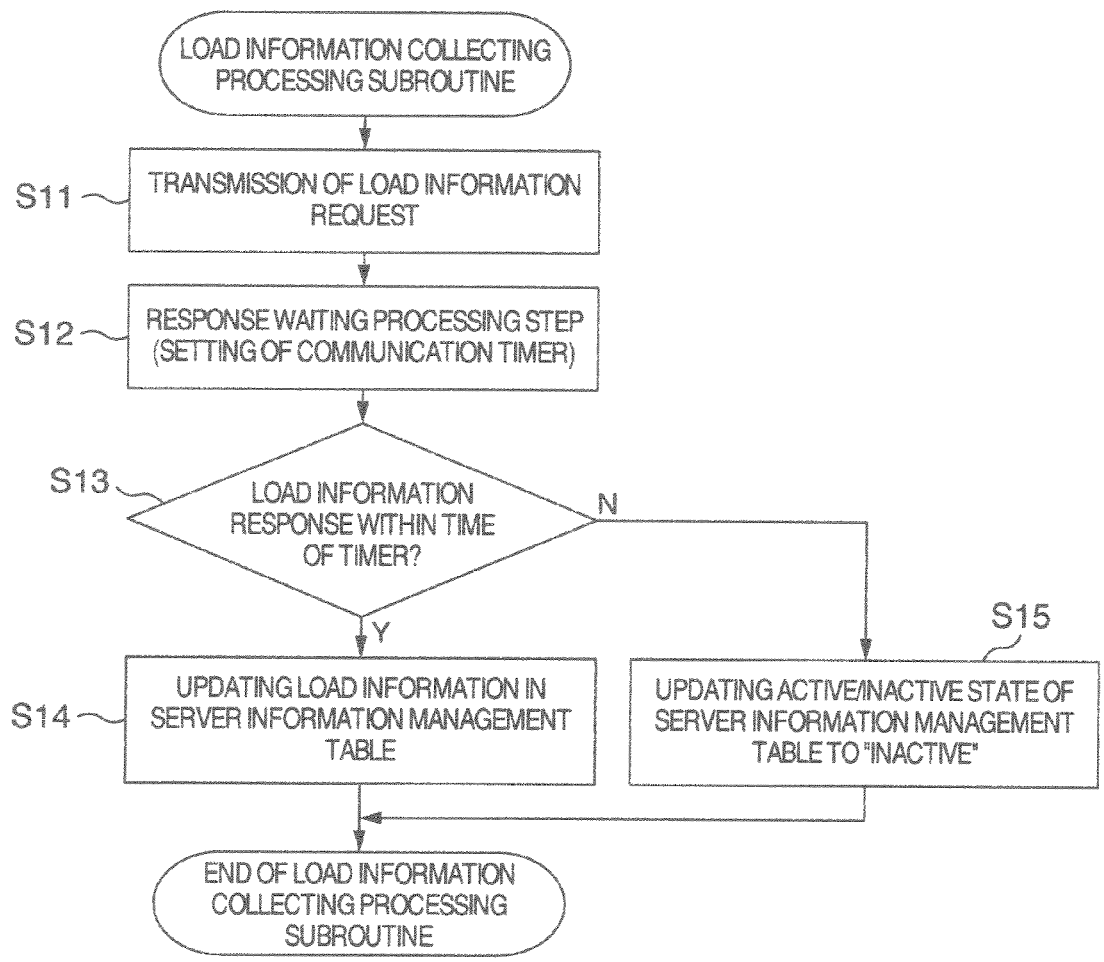

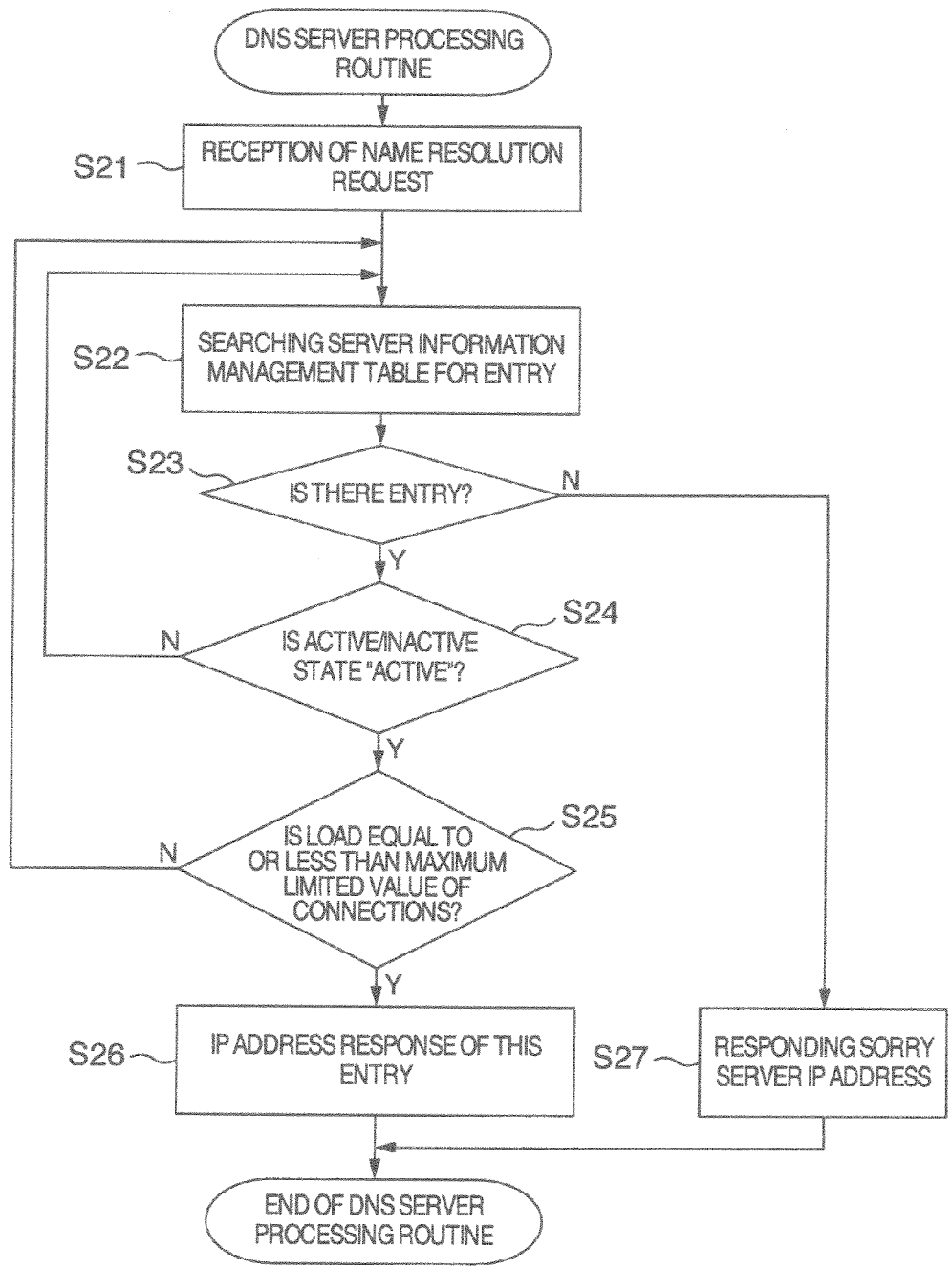

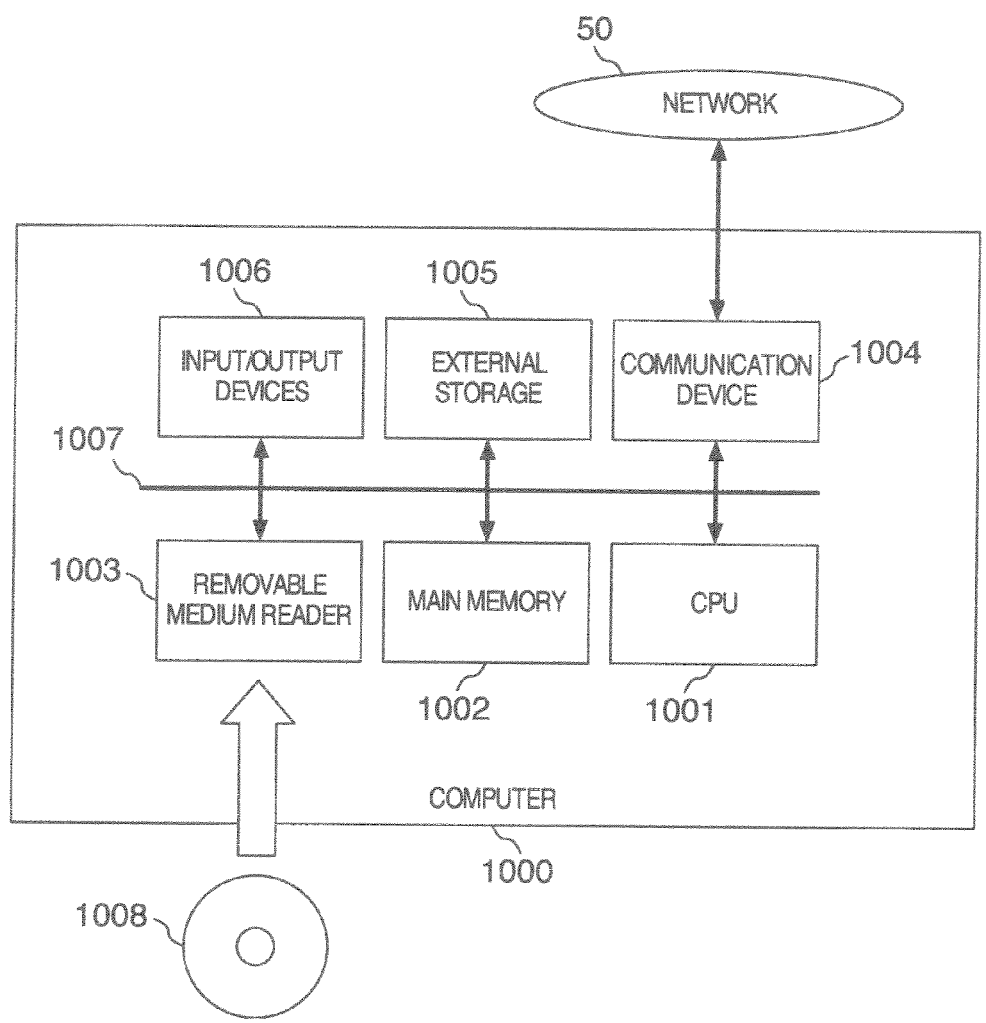

NETWORK SYSTEM

INCORPORATION BY REFERENCE

This application claims priority based on a Japanese patent application, No. 2010-236982 on Oct. 22, 2010, the entire contents of which are incorporated herein by reference.

BACKGROUND

The disclosed subject matter relates to a network system providing stable services in response to a service request from a client terminal.

In an IP network environment, there exists a technique known as DNS round robin for causing plural server apparatuses present in a domain name system (DNS) to be disguised as a single server for each client terminal in a virtual manner, the DNS being used to perform name resolution processing from the client terminals to the server apparatuses. The technique further operates to distribute the server load.

Furthermore, a DNS system technique described in U.S. Pat. No. 7,284,051, is available as a technique that has expanded the DNS round robin technique. In particular, a DNS server monitors how each server apparatus is loaded and sends back the IP addresses of lightly loaded server apparatuses as responses.

This US patent states that "A relaying apparatus comprises a client terminal, many server terminals connected via network to the client terminal, a DNS responding device which accepts a DNS inquiry from the client terminal via a client-side DNS device, and one path load measuring device for each of the server terminals which measures a load in the communication path up to the client-side DNS device. The DNS responding device distributes a work load by routing a service request from the client terminal to any one of the server terminals based on the measurement result (i.e. route load)" (abstract).

SUMMARY

The technique disclosed in U.S. Pat. No. 7,284,051 is a technique for distributing service requests from client terminals to plural server apparatuses. When name resolution is required from a client terminal, the IP addresses of especially lightly loaded server apparatuses are sent back as responses, thus leveling off the load. However, this technique has the problem that even if the server apparatuses are uniformly highly loaded or if a congestion is induced thereby or services are disabled, the service request from the client terminal reaches the server apparatus, thus deteriorating the situation further.

To solve the foregoing problem, a network system is disclosed herein which, for example, has a domain name system (DNS) server apparatus, one or more service providing server apparatus, and a Sorry server apparatus coupled together by a network and which provides services to the client terminal via the network.

The DNS server apparatus disclosed herein provides DNS services (i.e., name resolution processing services) to the client terminals. Furthermore, the DNS server apparatus is characterized in that it repeatedly (e.g., regularly) monitors an operation status, i.e., whether each service providing server apparatus is active or inactive and gathers load information. During name resolution processing, the DNS server apparatus determines what service providing server apparatus is selected in sending back its IP address as a response, depending on the collected information indicating whether the server apparatus is active or inactive and on the load information.

The service providing server apparatus provide Web services or Proxy services to client terminals. On receiving an HTTP access from a client terminal, the Sorry server apparatus sends back a reply message to the effect that the requested services cannot be offered.

In one embodiment of the invention, the DNS server apparatus disclosed herein has a means for causing an IP address assigned to the Sorry server apparatus to be sent back as a response in a case where the corresponding service providing server apparatus is active but congested as a result of name resolution processing or where the apparatus is inactive.

In another embodiment of the invention, the DNS server apparatus disclosed herein performs a server remote activation processing subroutine. In particular, when some server apparatus is active or congested or when the apparatus is inactive, the DNS server apparatus sends a server activation instruction and an IP address for services to another server apparatus on standby to activate it.

In addition, the DNS server apparatus may have a server information management table for managing information about each representative domain name of the service providing server apparatuses. The DNS server apparatus may be so configured that it performs a server monitoring processing routine for repeatedly performing a processing subroutine for an alive monitoring, i.e., for monitoring whether each service providing server apparatus is active or inactive, and a load information collecting processing subroutine. The results of the server monitoring processing routine may be recorded in the server information management table.

Each service providing server apparatus may be so configured that it performs a load information responding processing routine for sending back a response indicating the number of TCP connections coupled from each client terminal for each virtual IP address set into the service providing server apparatus itself in response to a load information collecting request from the DNS server apparatus.

The DNS server apparatus sends back a response indicating the IP address of the Sorry server apparatus. Consequently, when the server apparatus is congested or unable to provide services, further accesses to the server apparatus from client terminals which attempt new coupling are suppressed. As a result, further congestion of the server apparatus can be avoided.

When server apparatuses are congested or unable to provide services, the DNS server apparatus causes server apparatuses on standby to initiate a new server processing operation and to cause accesses from client terminals attempting to establish novel coupling to be distributed to new server apparatuses. Consequently, in a case where the traffic increases quickly, the processing can be continued without interrupting services to users.

According to the teaching herein, even if some server apparatus is congested or unable to provide services, further congestion can be prevented. Also, the processing can be continued without interrupting the services.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 2 is a diagram showing an example of configuration of a server information management table 23 of a DNS server apparatus 20.

FIG. 3 is a flowchart exemplifying an active/inactive state monitoring processing subroutine performed by the DNS server apparatus 20.

FIG. 4 is a flowchart exemplifying a load information collecting processing subroutine performed by the DNS server apparatus 20.

FIG. 5 is a flowchart exemplifying a DNS server processing routine performed by the DNS server apparatus 20.

FIG. 11 is a diagram showing an example of hardware configuration of each server apparatus.

DETAILED DESCRIPTION OF THE EMBODIMENTS

Embodiments of the invention are hereinafter described with reference to the drawings.

Figure 1:
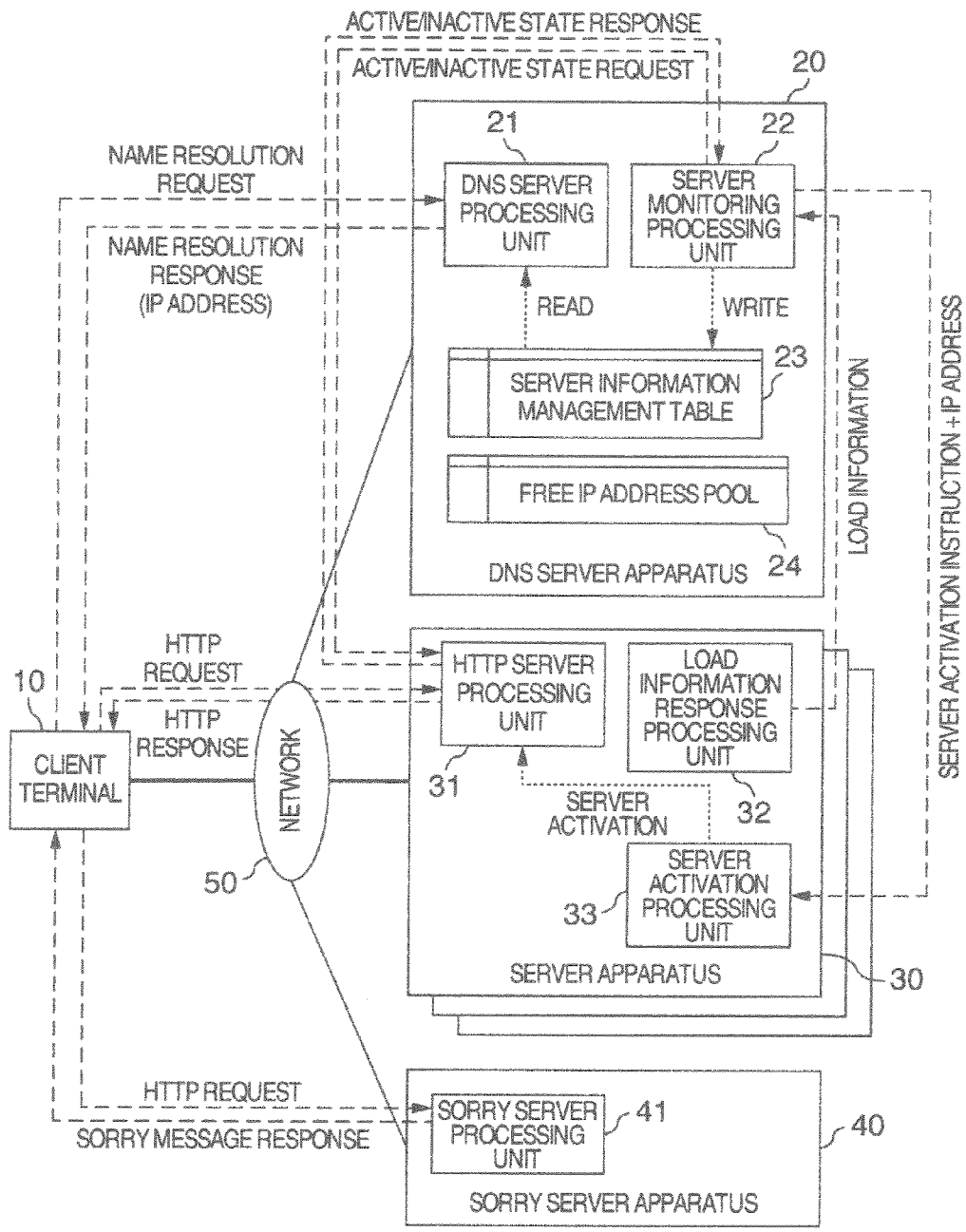
FIG. 1 is a diagram showing an example of configuration of a network system of the present invention.

FIG. 1 is a block diagram showing a first example of configuration of a network system associated with the present invention.

In FIG. 1, a client terminal 10, a DNS server apparatus 20, one or more server apparatuses 30, and a Sorry server apparatus 40 are coupled to a network 50 such as a LAN (Local Area Network) or wireless network and can be remotely coupled via the network 50.

The client terminal 10 is a user terminal that is coupled to the server apparatus 30 using TCP/IP protocols such as HTTP (HyperText Transfer Protocols) and makes a service request. The client terminal 10 sends a name resolution request about the representative domain name of each server apparatus 30 to the DNS server apparatus 20 using DNS protocols and receives a response consisting of the IP address of the server apparatus 30 before making access to the server apparatus 30.

The DNS server apparatus 20 is a server apparatus that provides name resolution services.

The DNS server apparatus 20 repeatedly (e.g., regularly) monitors whether the server apparatus 30 is active or inactive and collects load information. During the name resolution of the server apparatus 30, the DNS server apparatus 20 determines which IP address is used in making a response according to whether the server apparatus 30 is active or inactive and according to the load information. Furthermore, in a case where the server apparatus 30 is active but congested or where it is inactive, the server apparatus 20 sends back a response indicating an IP address assigned to the Sorry server apparatus 40.

Whenever an HTTP access is received from the client terminal 10, the Sorry server apparatus 40 sends a response message to inform users that the system is congested. The present processing routine is performed by a Sorry server processing unit 41. One example of the message is that "the present service is currently congested. Please access again after some time".

Since the DNS server apparatus 20 sends back a response indicating the IP address of the Sorry server apparatus 40 in a case where the server apparatus 30 is congested, further accesses from the client terminal 10, which attempts to establish novel coupling to the server apparatus 30, are suppressed.

Furthermore, in a case where some server apparatus 30 is active but congested or where it is inactive, the DNS server apparatus 20 sends a server activation instruction to another server apparatus 30 on standby to newly activate this apparatus. Also, the DNS server apparatus 20 sends an IP address for services (server remote activation processing subroutine). Consequently, during high load condition, the number of server apparatuses 30 is increased dynamically, thus alleviating the load on each server apparatus 30.

An "active" state referred to herein means that the power supply of a computer implementing the server apparatus is ON and that a program for implementing the server apparatus is run to permit services to be offered.

An "inactive" state referred herein means that the power supply of the computer implementing the server apparatus is not ON or that the power supply is ON and the program for implementing the server apparatus is run but services cannot be offered because of failure of the computer, a defect in the program, or for other reason.

A standby state means that the computer for implementing the server apparatus is activated but the program for implementing the server apparatus is not run and thus services cannot be offered. For example, when the power supply of the computer of some server apparatus is kept ON for preliminary purposes in preparation for a fault but the program for implementing the server apparatus is intentionally unactivated, the server apparatus is on standby.

The configuration of the DNS server apparatus 20 is described in detail.

The DNS server apparatus 20 has a DNS server processing unit 21, a server monitoring processing unit 22, a server information management table 23, and a free IP address pool 24.

When a name resolution request is received from the client terminal 10, the DNS server processing unit 21 performs a DNS server processing routine. The server monitoring processing unit 22 repeatedly (e.g., regularly) performs a server active/inactive state monitoring processing subroutine (i.e., monitors whether each server apparatus 30 is active or inactive) and a load collecting processing subroutine. Additionally, the processing unit 22 performs a processing subroutine for remotely activating the server apparatus 30.

The server information management table 23 is a table for managing information about the representative domain name of each server apparatus 30.

The configuration of the server information management table 23 is described by referring to FIG. 2. The table 23 manages a representative domain name 231, a host name 232, an IP address 233, a listening port 234, an active/inactive state 235, load information 236, a maximum limited value of connections 237 for each entry.

The representative domain name 231 is a host name that is a target access for the client terminal 10. The host name 231 is host name information permitting the server monitoring processing unit 22 to identify the server apparatus 30. The IP address 233 is a virtual IP address assigned to the server apparatus 30. The virtual IP address may be assigned by the DNS server apparatus during the server remote activation processing subroutine (described later) or assigned manually by the system administrator.

The client terminal 10 gains access to the virtual IP address. The listening port 234 is a TCP port number at which the server process of the server apparatus 30 is waiting for an access from the client terminal 10. Depending on the server process, the port number may be a UDP port number.

The active/inactive state 235 is information indicating whether the server apparatus 30 is active, inactive state, or on standby. The initial state of the active/inactive state 235 of each entry in the server information management table 23 may be set by a setting file when the DNS server apparatus 20 is activated. For example, a list of server apparatuses 30 in active state and a list of server apparatuses 30 on standby may be set in the setting file. During activation of the DNS server apparatus 20, the setting file may be read in and reflected in the server information management table 23. The DNS server apparatus 20 may offer a command to permit the administrator or the like to manually vary each entry having the active/inactive state 235 set to active or inactive state to standby state.

The load information 236 is a value indicating the load on the server apparatus 30. In this example, the load information is the number of TCP connections coupled to the server apparatus 30 from the client terminal 10. As another method, load information such as the CPU utilization may be used. The maximum limited value of connections 237 is a value representing the tolerable performance of the server apparatus 30. In this example, the value is roughly the number of TCP connections that can be coupled to the server apparatus 30 from the client terminal 10. This value is given as a set value during activation of the DNS server apparatus 20. In addition, the value may be dynamically varied according to conditions.

The free IP address pool 24 is a region for managing IP addresses that are assigned as virtual IP addresses to the server apparatuses 30 by the server remote activation processing subroutine. In this example, the pool is a memory region in which the IP addresses in a list form is managed in a simple manner. The management such as a management for increase and decrease may depend on a method consisting of manually setting a list of IP addresses by the system administrator. The management may also be carried out by dedicated system management software having a managing function.

Each entry of the free IP address pool 24 has a usage state field that is a field used to prevent the same IP address from being overlappingly assigned to plural server apparatuses 30. The server monitoring processing unit 22 sets either a value indicating availability (available state) or a value indicating in use to each usage state field. Where an IP address is not assigned to any server apparatus 30, the value indicating the availability is set in the usage state field of the entry having this IP address. Where an IP address is assigned to one server apparatus 30, the value indicating in use is set in the usage state field of the entry of this IP address. The DNS server apparatus 20 initializes the usage state field of every entry of the free IP address pool 24 to availability immediately after activation.

An example of hardware configuration of the client terminal 10, DNS server apparatus 20, server apparatuses 30, and Sorry server apparatus 40 is shown in FIG. 11

These server apparatuses can be implemented by a general computer 1000 having a CPU 1001, a main memory 1002, an external storage 1005 such as a HDD, a removable medium reader 1003 for reading information from a removable medium 1008 such as a CD-ROM or DVD-ROM, input/output devices 1006 such as a display device, a keyboard, and a mouse, a communication device 1004 such as an NIC (Network Interface Card) for coupling to the network 50, and an internal communication line 1007 such as a bus for interconnecting the devices.

For example, the serve information management table 23 is realized by using a region of the main memory 1002.

The DNS server apparatus 20, server apparatuses 30, and Sorry server apparatus 40 implement various processing units in the present embodiment and various kinds of processing performed by them by loading various programs stored in their respective external storages 1005 into the main storage 1002, executing the programs by means of the CPU 1001, coupling them to the network 50 using the communication device 1004, and performing network communications with the client terminal 10 or other server apparatuses.

The processing subroutine performed by the server monitoring processing unit 22 to monitor whether the server apparatus is active or inactive is now described by referring to FIG. 3.

First, the server monitoring processing unit 22 sends an active/inactive state request to the virtual IP addresses and port numbers of the server apparatuses 30 whose active/inactive state 235 is active or inactive, based on information about the IP address 233, listening port 234, and active/inactive state 235 of the server information management table 23 (step S01). This request may be either a dedicated HTTP requesting message having a request line starting, for example, with "GET/health-check.cgi HTTP/1.1" or a dummy service request.

Then, a processing routine for waiting for a response about the active/inactive state from the server apparatus 30 is performed (step S02). At this time, an active/inactive state response waiting timer is also set.

A check is made as to whether there is a response to the active/inactive state request within the time of the active/inactive state response waiting timer (step S03). With respect to the response to the active/inactive state request, if the state is an active state, for example, the response is an HTTP response having a response status given by "HTTP/1.1 200 OK". If the state is an inactive state, the response is other HTTP error response or no response. If there is a response to the active/inactive state request from one server apparatus 30, the active/inactive state 235 of the server information management table 23 is updated to an "active" state (step S04). Conversely, if there is no response to the active/inactive state, the active/inactive state 235 of the server information management table 23 is updated to an "inactive" state (step S05).

The processing subroutine performed by the server monitoring processing unit 22 to collect load information is next described by referring to FIG. 4.

First, the server monitoring processing unit 22 sends a load information request to each server apparatus 30 whose active/inactive state 235 is active, based on information about the host name 232 and active/inactive state 235 in the server information management table 23 (step S11). For example, this request is a request message relying on a unique protocol. Then, a processing routine for waiting for a load information response from the server apparatus 30 is performed (step S12). At this time, the load information response waiting timer is also set.

Then, a check is made as to whether there is a response about the load information within the time of the load information response waiting timer (step S13). For instance, the response about the load information is a response message relying on a unique protocol and setting forth the number of HTTP connections received by the server apparatus 30. If there is a response about the load information from the server apparatus 30, the load information 236 in the server information management table 23 is updated to a value indicating the number of HTTP connections set forth in the response message (step S14). Conversely, if there is no response about the load information, the load information 236 in the server information management table 23 is updated to "inactive" state and the load information 236 is updated to 0 (step S15).

One example of DNS server processing routine performed by the DNS server processing unit 21 is next described by referring to FIG. 5.

First, the processing unit waits until a name resolution request from the client terminal 10 is received (step S21).

If the name resolution request is received, the server information management table 23 is searched using a search key made of the representative domain name of an entity subjected to the name resolution request. Entry information having a representative domain name 231 coincident with the representative domain name of the entity subjected to the name resolution request is obtained (step S22).

One example of the processing routine is to obtain pieces or sets of entry information in turn from the head entry of the server information management table 23 toward the end entry.

If entry information can be obtained in step S22, control proceeds to step S24 it cannot be obtained, control goes to step S27 (step S23). The case in which no entry information can be obtained is a case where a search of all entries is completed.

A check is made as to whether or not the active/inactive state 235 in the obtained entry information is active (step S24). If it is active, control goes to step S25; otherwise, control returns to S22, where the next entry information is obtained.

In step S25, a check is made as to whether the value of the load information 236 is equal to or less than the maximum limited value of connections 237. If so, control goes to step S26; otherwise, control goes back to step S22, where the next entry information is acquired.

In step S26, the DNS server processing unit 21 sends back a response indicating the value of the IP address 233 of the entry to the client terminal 10 and terminates the DNS server processing routine.

If no entry information can be obtained in step S23, the IP address of the Sorry server apparatus 40 is sent back as a response (step S27). The IP address of the Sorry server apparatus 40 may be previously set forth in a setting file within the external storage 1005 of the DNS server apparatus 20, and during activation of the DNS server apparatus 20, the setting file may be read and held in the main storage 1002. In step S27, the IP address may be sent back as a response.

Figure 6:
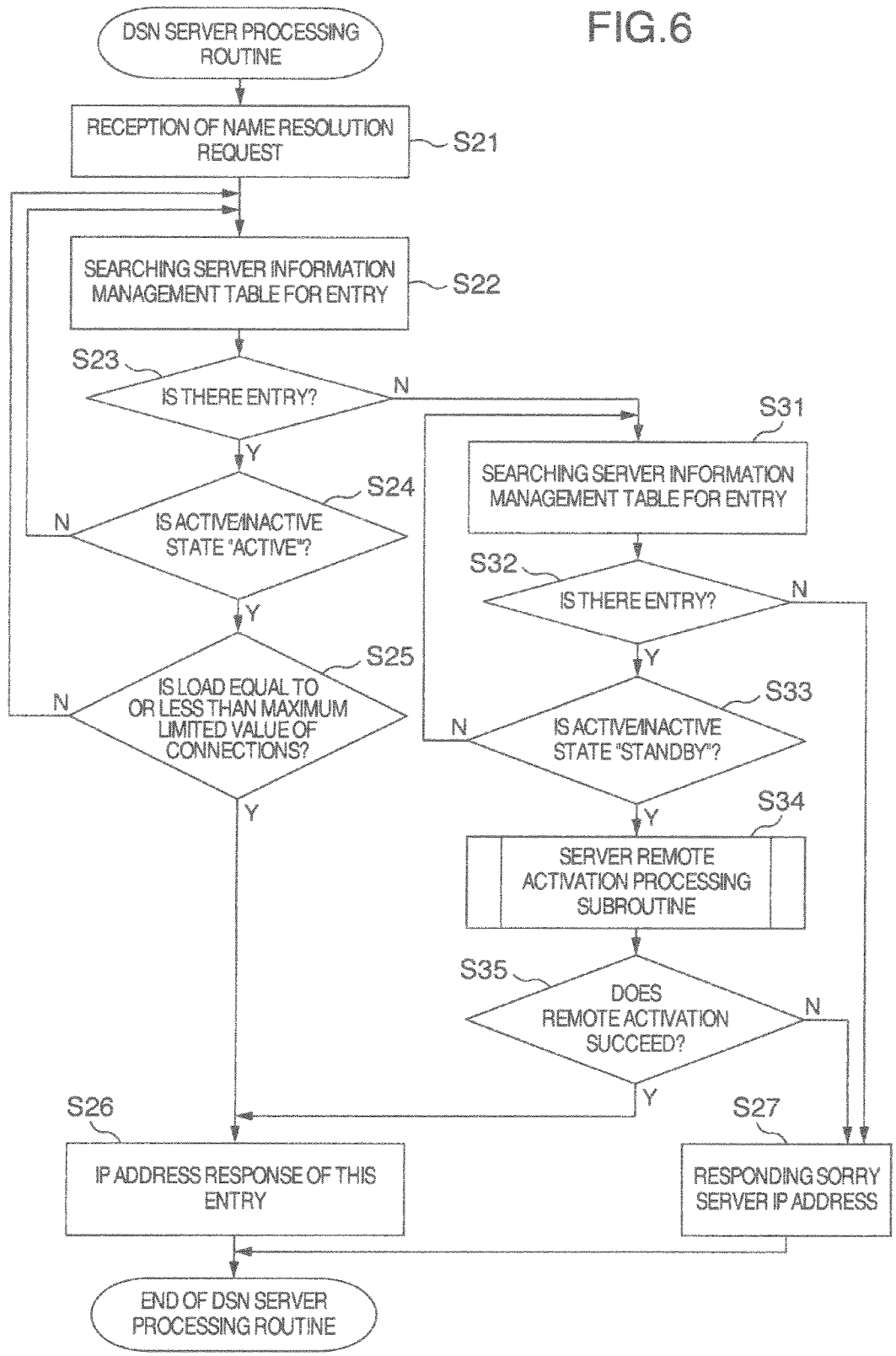
FIG. 6 is a flowchart exemplifying another example of DNS server processing routine performed by the DNS server apparatus 20.

Then, another example of the DNS server processing routine performed by the DNS server processing unit 21 is described by referring to FIG. 6. In this example, the contents of the processing of the steps S21 to S27 are the same as in the case of FIG. 5.

In step S23, if entry information can be obtained, control proceeds to step S24, where processing similar to the processing of FIG. 5 is performed. If no entry information can be obtained, control goes to step S31. In steps S31-S33, a search is made for an entry whose active/inactive state is standby. The processing is described in further detail below.

Arbitrary entry information is obtained from the server information management table 23 (step S31). One example of the processing is to obtain pieces or sets of entry information in turn from the head entry of the server information management table 23 toward the end entry.

If entry information is successfully obtained in step S31, control goes to step S33. If such information is not obtained, control passes to step S27 (step S32). The case in which such information cannot be obtained is a case where a search of all entries is completed but any entry whose active/inactive state is standby is not found.

A check is made as to whether the active/inactive state 235 of the obtained entry information is standby (step S33). If so, control goes to step S34; otherwise, control returns to step S31, where the next entry information is obtained.

In step S34, the server remote activation processing subroutine is performed. The details of the contents of the processing subroutine will be described later.

If the server remote activation processing subroutine is successfully done in step S34, control passes to step S26. If the subroutine fails, control goes to step S27 (step S35).

Figure 7:
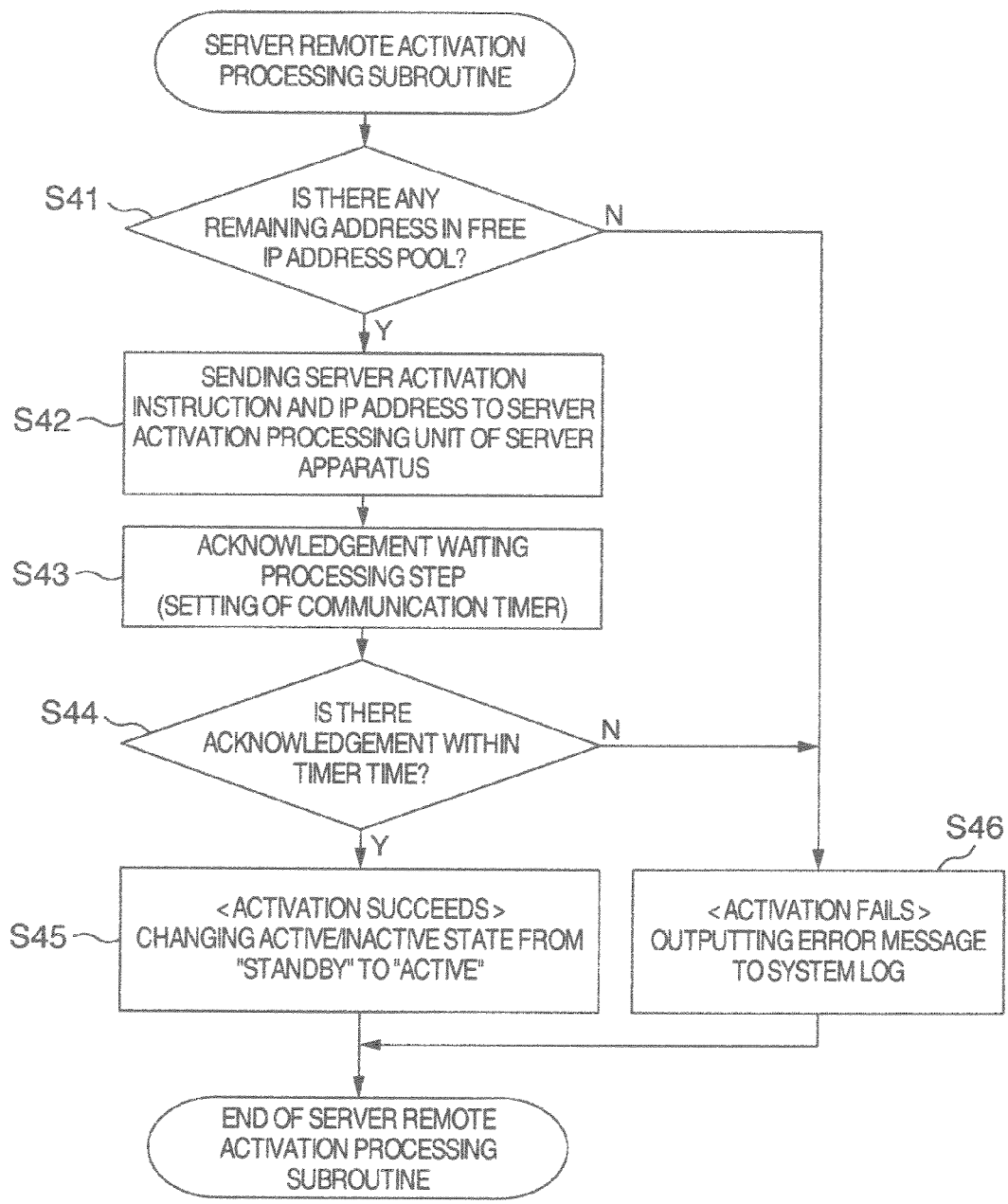
FIG. 7 is a flowchart exemplifying a server remote activation processing subroutine performed by the DNS server apparatus 20.

One example of the contents of the server remote activation processing subroutine performed by the server monitoring processing unit 22 of the DNS server apparatus 20 in step S34 is now described by referring to FIG. 7.

The server remote activation processing subroutine is performed by the server monitoring processing unit 22 to issue a new instruction for activating any one of the server apparatuses 30 whose active/inactive states 235 of the server information management table 23 is a standby state.

First, the server monitoring processing unit 22 makes a check as to whether there is at least one IP address, whose usage state field value indicates availability, in the free IP address pool 24 (step S41). If at least one IP address in available state exists (Y at S41), the processing unit sends a server activation instruction and the value of the IP address to the server activation processing unit or units 33 of any one or more of the server apparatuses 30 whose active/inactive state 235 of the server information management table 23 is standby to vary the usage state field of the sent entry of the IP address in the free IP address pool 24 to in use (step S42).

One example of the method of selecting a server apparatus 30 in a case where there are plural server apparatuses 30 on standby is to select that of the entries which is closest to the head position of the server information management table 23 and whose active/inactive state 235 is standby.

Then, an activation acknowledgement waiting processing step for each server apparatus 30 is performed (step S43). At this time, an activation acknowledgement waiting timer is also set. A check is made as to whether there is an activation acknowledgement within the time of the activation acknowledgement waiting timer (step S44).

If there is an activation acknowledgement (Y at S44), then the processing session is regarded as successful. Information about the active/inactive state 235 is varied from standby to active, and then the present processing routine is ended (step S45). If there is no IP address in step S41 (N at S41), or if there is no activation acknowledgement within the timer time in step S44 (N at S44), then the processing session is regarded as unsuccessful. An error message is output to the system log, and the present processing routine is ended (step S46).

The server apparatus 30 is an apparatus that runs a server process providing Web services or Proxy services to the client terminal 10. The server apparatus 30 has an HTTP server processing unit 31, a load information response processing unit 32, and a server activation processing unit 33. When an HTTP request is received from the client terminal 10, the HTTP server processing unit 31 performs HTTP server processing. In response to a load information collecting request from the server monitoring processing unit 22 of the DNS server apparatus 20, the load information response processing unit 32 sends back a response indicating the number of TCP connections coupled from the client terminal 10 for each virtual IP address. As another method, load information such as the CPU utilization of the server apparatus 30 may be used. The server activation processing unit 33 performs the server activation processing in response to a server activation instruction from the DNS server apparatus 20.

Figure 8:
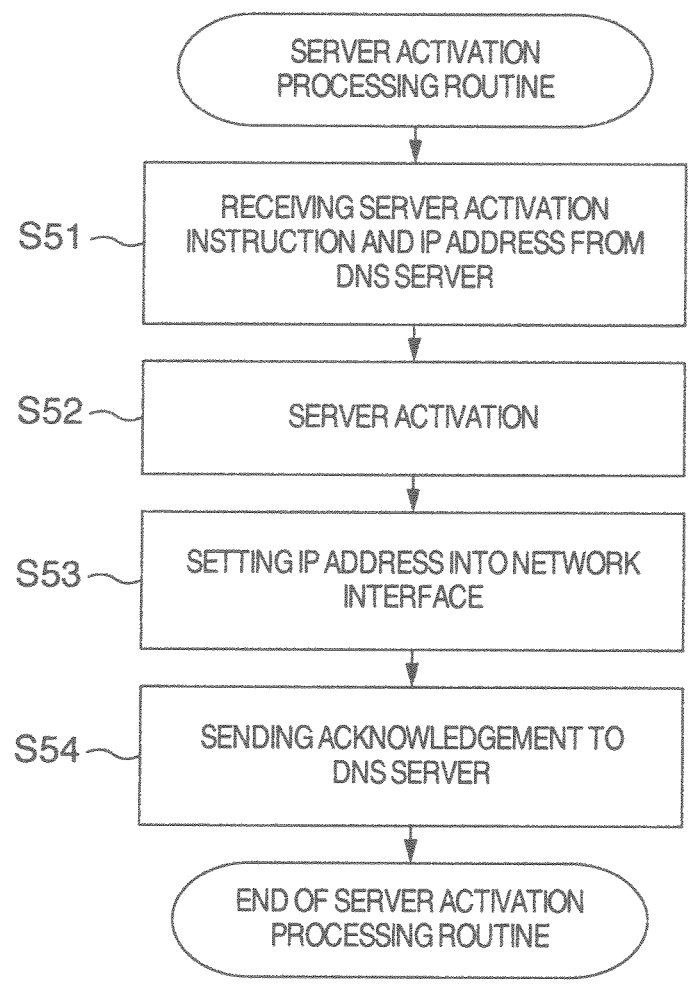
FIG. 8 is a flowchart exemplifying a server activation processing routine performed by each server apparatus 30.

The server activation processing performed by the server activation processing unit 33 of the server apparatus 30 is now described by referring to FIG. 8.

First, the server activation processing unit 33 waits until a server activation instruction and an IP address are sent from the server monitoring processing unit 22 of the DNS server apparatus 20 in step S32 (step S51). If they are received, the processing unit activates a server application in the HTTP server processing unit 31 (step S52). The activated server may be a virtual server operating on a virtual machine. After the activation of the server, the IP address received at step S51 is set as a virtual IP address into the network interface (step S53). Finally, an activation acknowledgement is sent to the DNS server apparatus 20 (step S54).

Figure 9:
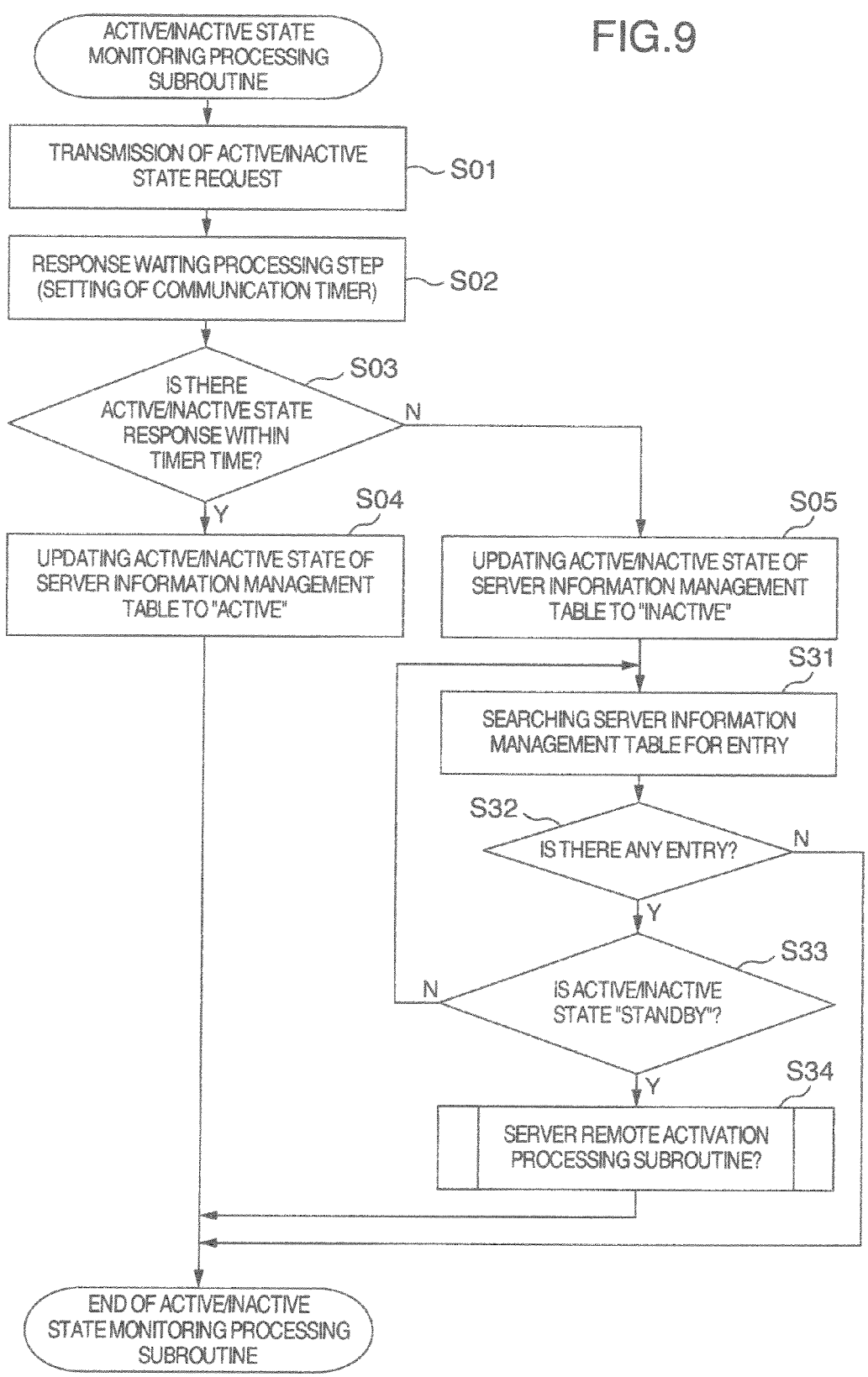
FIG. 9 is a flowchart exemplifying another example of active/inactive state monitoring processing routine performed by the DNS server apparatus 20.

Another example of the processing routine performed by the server monitoring processing unit 22 to monitor whether the server apparatus is active or inactive is next described by referring to FIG. 9. In this example, the contents of the processing of steps S01 to S05 are the same as the contents of the processing of the example of FIG. 3. Furthermore, the contents of processing of steps S31-S34 are the same as the contents of processing of the example of FIG. 6.

After varying the active/inactive state 235 to inactive state in step S05, the server remote activation processing subroutine is performed to activate severs on standby. In particular, after performing the step S05, the step S31 is carried out. Control then goes to step S32. If entry information can be obtained, the server remote activation processing subroutine in step S34 is effected. Then, the active/inactive state monitoring processing routine is ended. If no entry information can be obtained in step S32, the active/inactive state monitoring processing routine is ended in a simple manner.

Figure 10:
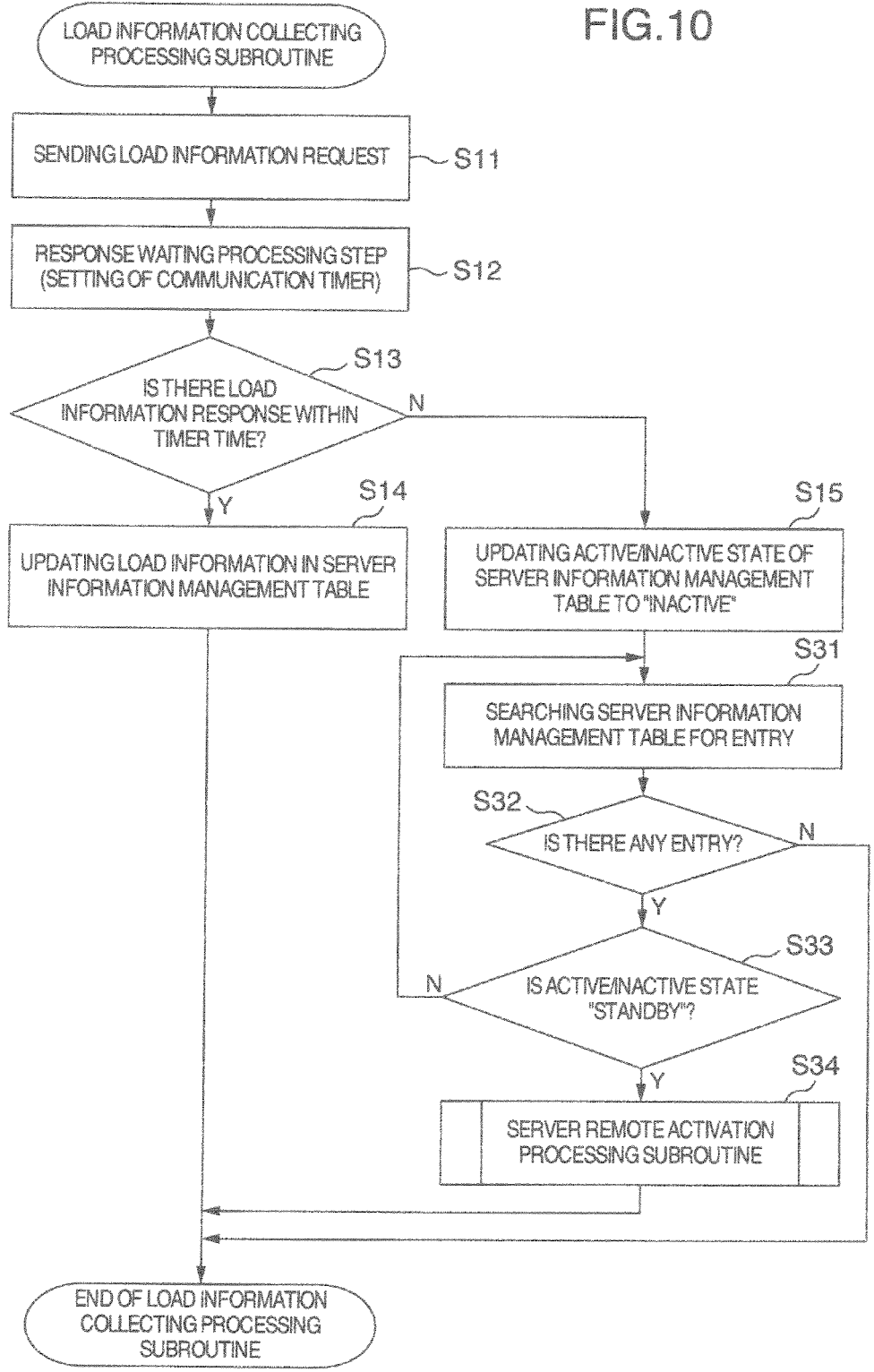
FIG. 10 is a flowchart exemplifying another example of load information collecting processing routine performed by the DNS server apparatus 20.

Another example of the load information collecting processing subroutine performed by the server monitoring processing unit 22 is next described by referring to FIG. 10. In this example, the contents of processing of steps S11 to S15 are the same as the contents of processing of the example of FIG. 4. Furthermore, the contents of processing of steps S31-S34 are the same as the example of FIG. 6.

After modifying the active/inactive state 235 to inactive state in step S15, the server remote activation processing subroutine is performed to activate servers on standby. In particular, after performing the step S15, step S31 is performed. Control then goes to step S32. If entry information has been successfully obtained, the server remote activation processing subroutine in step S34 is performed. Then, the load information collecting processing subroutine is ended. If no entry information is obtained in step S32, the load information collecting processing subroutine is ended in a simple manner.

It is to be understood that the present invention is not limited to the above-described embodiments and that the invention can be variously modified or applied.

The specification and drawings are, accordingly, to be regarded in an illustrative rather than a restrictive sense. It will, however, be evident that various modifications and changes may be made thereto without departing from the spirit and scope of the invention(s) as set forth in the claims.

The invention claimed is:

1. A network system having a domain name system (DNS) server apparatus, one or more service providing server apparatuses, and a Sorry server apparatus coupled together by a network, the network system configured to provide services to a client terminal using the network;

wherein when a name resolution request is received from the client terminal, the DNS server apparatus is configured to perform a DNS server processing routine including performing the name resolution on the client terminal and sending back a response indicating IP addresses of corresponding one or more of the service providing apparatuses;

wherein the one or more service providing server apparatuses are configured to provide Web services or Proxy services to the client terminal;

wherein when an HTTP access is received from the client terminal, the Sorry server apparatus is configured to send back a response message indicating that the required services cannot be offered;

wherein the DNS server apparatus is configured to repeatedly monitor whether each of the service providing server apparatuses is active or inactive and to collect load information;

wherein when the corresponding service providing server apparatus is active but congested or inactive as a result of the name resolution, the DNS server apparatus is configured to send back a response indicating an IP address assigned to the Sorry server to the client terminal;

wherein the DNS server apparatus has a server information management table for managing information about each representative domain name of the service providing server apparatuses, is configured to perform a server monitoring processing routine that repeatedly performs an active/inactive state monitoring processing subroutine for each of the service providing server apparatuses and a load information collecting processing subroutine, and to record results of the server monitoring processing routine into the server information management table;

wherein each of the service providing server apparatuses is configured to perform a load information response processing routine including sending back a response indicating the number of TCP connections coupled from the client terminal for each virtual IP address set in the server apparatus itself in response to a load information collecting request from the DNS server apparatus;

wherein the server information management table has an IP address field, a listening port field, and an active/inactive state field for each entry;

wherein the IP address field is a field for managing IP addresses assigned to the service providing server apparatuses as virtual IP addresses;

wherein the listening port field is a field for storing a TCP or UDP port number at which each service providing server apparatus is waiting for an access from the client terminal;

wherein the active/inactive state field is a field for storing information indicating whether each service providing server apparatus is active, inactive, or on standby;

wherein during the active/inactive state monitoring subroutine, the DNS server apparatus is configured to send an active/inactive state request to the virtual IP address and port number of the service providing server apparatuses, whose value of the active/inactive state field indicates an active or inactive state based on information in the IP address field, the listening port field, and the active/inactive state field within the server information management table, to wait for a response to the active/inactive state request from the service providing server apparatus while monitoring a timer, to update the active/ inactive state field of the server information management table to "active" when there is a response to the active/inactive state request from the service providing server apparatus within a time set by the timer, and to update the active/inactive state field to "inactive" when there no such response;

wherein the server information management table has a host name field and a load information field for each entry;

wherein the host name field is a field for storing host name information permitting server monitoring processing means to identify the service providing server apparatuses;

wherein the load information field is a field for storing the number of TCP connections coupled from the client terminal to the service providing server apparatuses as a value indicating load on the service providing server apparatuses;

wherein during the load information collecting processing subroutine, the DNS server apparatus is configured to send the load information request to the service providing server apparatuses, whose value of the active/inactive state field is "active" based on information in the host name field and the active/inactive state field of the server information management table, is waiting for a response to the load information request from the service providing server apparatuses while monitoring the timer, to update the load information field in the server information management table to a value indicating the number of HTTP connections contained in a response when there is the response to the load information request from the service providing server apparatuses within a time set by the timer, and to update the active/inactive state field to "inactive" when there is no such response;

wherein the server information management table has a representative domain name field and a maximum limited value of connections field for each entry;

wherein the representative domain name field is a field for storing a host name becoming a target access for the client terminal;

wherein the maximum limited value of connections field is a field for storing the number of TCP or UDP connections permitted to be coupled from the client terminal to the service providing server apparatuses as a value indicating the permissible performance of the service providing server apparatuses; and wherein during the DNS server processing routine, the DNS server apparatus is configured to search the representative domain name field of the server information management table based on a representative domain name of an object or entity subjected to a name resolution request when the name resolution request is received, to send back the value of the IP address field of the entry producing a hit with the search when the active/inactive state field of the entry producing the hit is "active" and, at the same time, when the value of the load information field is equal to or less than the value of the maximum limited number of connections field, to send back a response indicating the value of the IP address field of the entry to the client terminal, to make a check as to whether the active/inactive state field is "active" when the active/inactive state field is other than "active" or when the value of the load information field is equal to or greater than the value of the maximum limited number of connections field and, at the same time, when there is any other entry whose value of the representative domain name field is the same, and to send back a response indicating the IP address of the Sorry Server when there is no such other entry.

2. The network system according to claim 1, wherein the DNS server apparatus is configured to perform a server remote activation processing subroutine that issues an activation instruction to the service providing server apparatuses on standby.

3. The network system according to claim 2, wherein the server remote activation processing subroutine is configured to be activated when any one of the service providing server apparatuses is overloaded.

4. The network system according to claim 2, wherein the server remote activation processing subroutine is activated when any one of the service providing server apparatuses is inactive.

5. The network system according to claim 2, wherein the DNS server apparatus has a free IP address pool that is a memory region configured to manage IP addresses to be assigned to the service providing server apparatuses, wherein the server remote activation processing subroutine includes sending a server activation instruction and an IP address to the service providing server apparatus indicated by the host name field of an entry whose value of the active/inactive state field of the server information management table indicates a "standby" state to instruct the server apparatus to activate itself when at least one IP address is pooled in the free IP address pool, performing an activation acknowledgement in response to the server activation instruction while monitoring the timer, modifying the value of the active/inactive state field from the value indicating a "standby" state to a value indicating an "active" state when there is an activation acknowledgement within a time set by the timer and terminating the server remote activation processing subroutine, and outputting an error message to a system log in a case where there are no such IP addresses pooled or where there is no activation acknowledgement from the service providing server apparatus on standby within the time set by the timer to thereby terminate the server remote activation processing subroutine; and wherein the service providing server apparatus on standby is configured to wait for transmission of a server activation instruction and an IP address by the DNS server apparatus, activate the HTTP server processing means when the server activation instruction and IP address are received, to set the IP address as a virtual IP address into the network interface, and to send an activation acknowledgement to the DNS server apparatus.

6. The network system according to claim 5, wherein the server remote activation processing subroutine is configured to be activated when any one of the service providing server apparatuses is overloaded.

7. The network system according to claim 5, wherein the server remote activation processing subroutine is configured to be activated when any one of the service providing server apparatuses is inactive.

* * * * *